Dec. 20, 1966     F. L. McRAY ETAL     3,292,751
OPERATING MECHANISM FOR FLUID PRESSURE MASTER
CLUTCH AND TRANSMISSION CLUTCHES
Filed Dec. 1, 1964     2 Sheets-Sheet 1
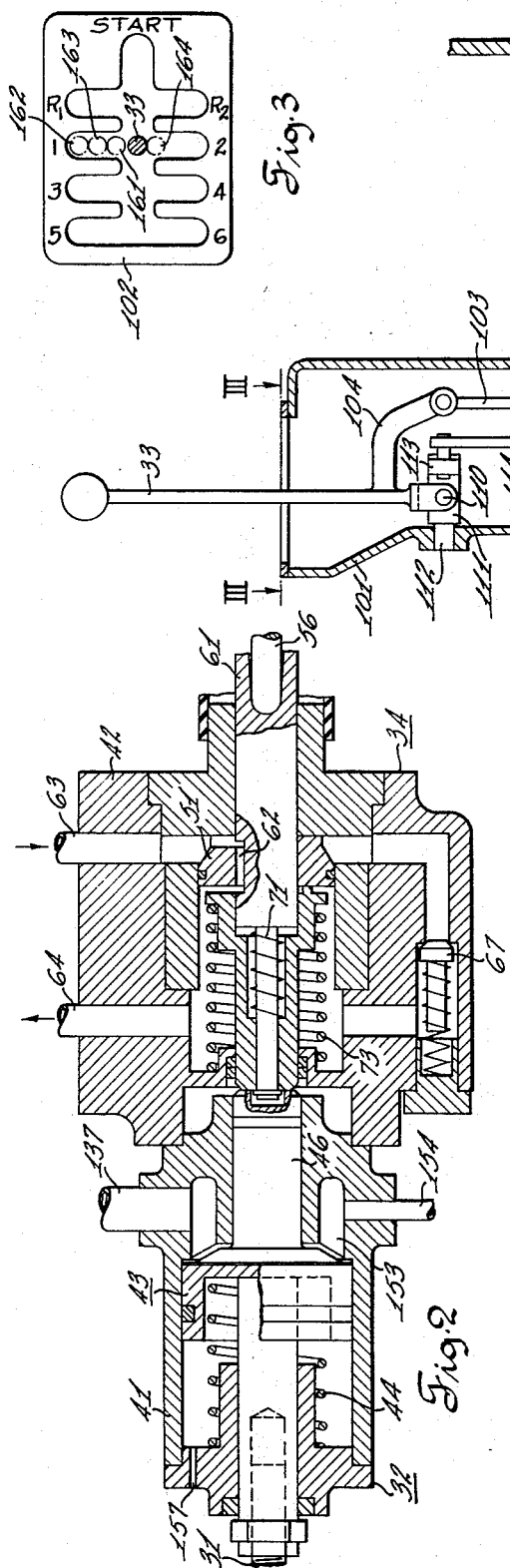
Inventors
Ferris L. McRay
Frederick W. McBride, Jr.
By Charles C. Schwartz
Attorney

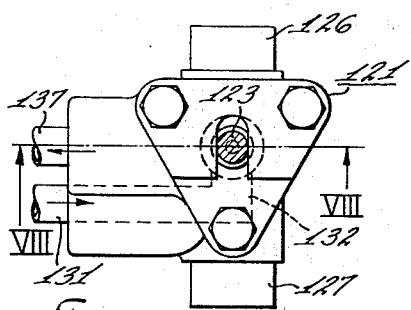
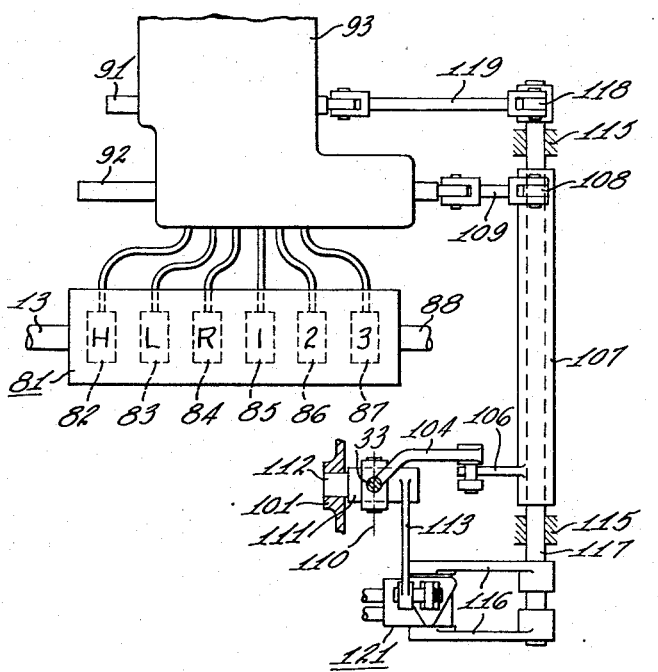
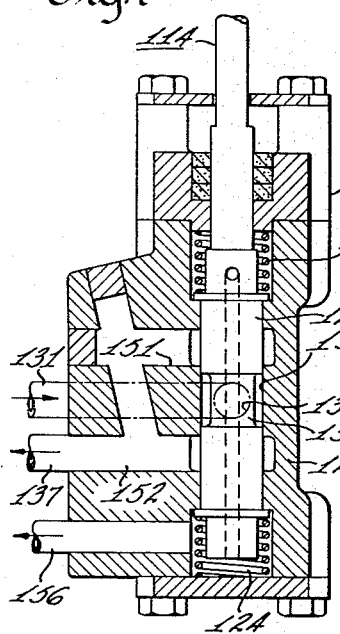
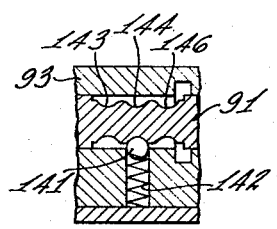
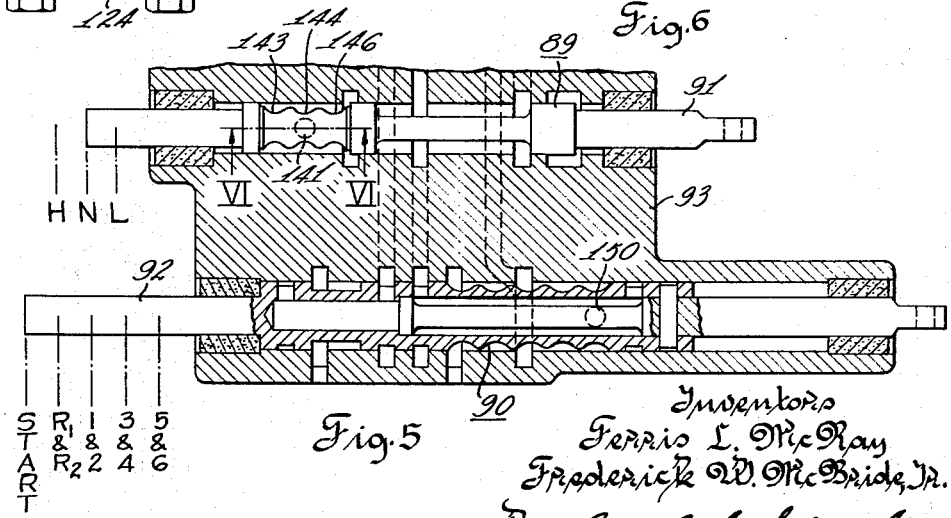

United States Patent Office 3,292,751
Patented Dec. 20, 1966

3,292,751
OPERATING MECHANISM FOR FLUID PRESSURE MASTER CLUTCH AND TRANSMISSION CLUTCHES
Ferris L. McRay and Frederick W. McBride, Jr., Springfield, Ill., assignors to Allis-Chalmers Manufacturing Company, Milwaukee, Wis.
Filed Dec. 1, 1964, Ser. No. 414,951
9 Claims. (Cl. 192—3.5)

This invention relates to an automatic control for disengaging the master clutch of a vehicle power train during transmission speed changes.

It is a primary object of this invention to provide means for automatically disengaging the master clutch of a vehicle power train during establishment and disestablishment of drive through the change speed transmission.

It is a further object of this invention to provide a control as outlined in the previous object wherein the master clutch is fluid power operated through valve means which constitute a part of the manual control linkage for selecting transmission speeds.

It is a further object of this invention to provide a control as outlined in the previous objects wherein initial manual movement of the transmission control linkage effects operation of the control valve for the master clutch and further movement effects engagement or disengagement of the transmission drive establishing means, and wherein said master clutch reengages when the control linkage is manually released.

It is a further object of this invention to provide a control as hereinbefore outlined and wherein additional means are provided to manually operate the master clutch independently of the control linkage for the change speed transmission.

These and other objects and advantages of this invention will be apparent when the following description is read in conjunction with the drawings in which:

FIG. 1 is a sectional view of the present invention incorporated in a control for a vehicle power train;

FIG. 2 is a section view of fluid power means for operating the master clutch;

FIG. 3 is a view taken along the line III—III in FIG. 1;

FIG. 4 is a top view of the control linkage shown in FIG. 1;

FIG. 5 is a section view of the transmission control valves;

FIG. 6 is a section view taken along the line VI—VI in FIG. 5;

FIG. 7 is a top view of the master clutch control valve; and

FIG. 8 is a section view taken along the line VIII—VIII in FIG. 7.

This invention is advantageously used in motor vehicles operating under heavy load, such as motor graders wherein it is often desired to change transmission speeds while the vehicle is in motion and under load. This invention has particular utility in vehicle power trains using a power shift change speed transmission with friction clutches since in such power trains the friction clutches of the transmission are conventionally engaged and disengaged with the transmission input shaft connected to the propelling engine. This results in considerably more clutch facing wear than would be the case if the input power is disconnected during transmission clutch engagement and disengagement.

Referring to FIG. 1, a master clutch 11 is employed to connect an engine drive shaft 17 and flywheel 12 to a transmission input shaft 13. A suitable flywheel housing 14 is provided for the engine or master clutch 11 and is secured by suitable means, not shown, to the vehicle engine 16. The flywheel 12 has a cover plate 18 and shiftably supports clutch engaging plate 19. The clutch engaging plate 19 is moved into engagement with a friction plate 21 splined to shaft 13 by spring means 22 and is disengaged therefrom by a clutch operating mechanism 23 including a throwout bearing 24 and levers 26. The clutch throwout bearing 24 is shifted axially from the clutch engaged position in which illustrated to a clutch disengaged position by a yoke 27 secured to a shaft 28 which in turn is pivoted on clutch housing 14. The shaft 28 is pivoted by a lever 29 secured thereto and connected to the forward end of a thrust rod 31. The master clutch is operated automatically by fluid power means 32 upon the operator moving a manual transmission control lever 33. The master clutch may also be operated by a second power means 34 upon the operator depressing foot pedal 36.

Referring also to FIG. 2, the housings 41, 42 of the power means 32, 34 are secured together by suitable means, not shown. The push rod 31 is secured to the actuator piston 43 which is biased by spring 44 to its illustrated retracted clutch engaged position. In its retracted position the reduced diameter portion 46 of piston 43 abuts the end of piston 51 of power means 34. When the operator presses foot pedal 36, lever 58, link 57 and multiarm lever 59 move push rod 56 to the left as viewed in FIG. 1, thus pushing valve 61 to the left closing port 62 in piston 51. An engine driven pump supplies pressure fluid to power means 34 through conduit 63 which, as illustrated in FIG. 2, flows through the open port 62 and out discharge conduit 64. When the port 62 is closed the fluid pressure will cause the piston 51 to move to the left, as viewed in FIG. 2, thereby pushing piston 43 of power means 32 to the left causing push rod 31 to effect disengagement of the master clutch 11. A suitable pressure relief valve 67 is provided in power means 34. Upon release of the foot pedal 36, spring 68 interconnecting lever 59 and the vehicle chassis 69 will permit valve 61 to move to the right under the influence of spring 71 thereby again opening port 62 and thereby dumping the pressure fluid. Spring 73 then returns piston 51 to its clutch engaged position in which illustrated and spring 44 returns piston 43 to its retracted, clutch engaged position. Spring means 22 effect reengagement of master clutch 11.

Referring now to FIGS. 1, 3 and 4, a control linkage for operating drive establishing means of change speed transmission 81 will now be described. The drive establishing means of the power shift transmission 81 are fluid actuated friction type clutches 82, 83, 84, 85, 86, 87. These clutches being high range, low range, reverse, first speed, second speed and third speed clutches, respectively. In order for power to be transmitted from input shaft 13 to output shaft 88, one of the high and low range clutches 82, 83 must be engaged and also one of the reverse and forward speed clutches 84, 85, 86, 87 must be engaged.

The means for selectively actuating the fluid actuated clutches 82 through 87 of the change speed transmission include a range valve 89 and a speed selector valve 90. These control valves include flow control components in the form of spools 91, 92 which are shiftably positioned in bores of a housing 93. The valve passages and components are so arranged that the clutches 84, 85, 86 and 87 associated with control valve 90 remain disengaged so long as range valve spool 91 is in its neutral position in which illustrated. The means for selectively actuating the fluid actuated transmission clutches also includes a manually operated control linkage including the control member or lever 33 and the links and levers interconnecting the control lever 33 and the control valve spools 91, 92.

The control lever 33 is universally connected to an upstanding housing 101. The shift pattern of control lever 33 is shown on the shift plate 102 illustrated in FIG. 3. Transmission control valve spool 92 is operated by longitudinal swinging movement of lever 33 through a vertical rod 103 pivotally connected at its upper end to an arm 104 of lever 33 and pivotally connected at its lower end to an arm 106, rigidly secured to a hollow shaft 107. The hollow shaft has an upstanding arm 108 pivotally connected to spool 92 through a link 109. Thus by moving control lever 33 longitudinally, right and left as viewed in FIG. 3, the spool 92 may be shifted from its start position to its reverse and three forward speed positions. Movement of the control lever 33 transversely to such longitudinal movement, will shift the spool 91 from its neutral position to either of its high or low positions. This is permitted by virtue of the control lever 33 being pivoted on a transverse axis 110 to a sleeve 111, pivoted in turn on stationary shaft 112. A transversely extending arm 113 of sleeve 111 is pivotally connected through a lost motion link 114 to arms 116 which in turn are secured to a shaft 117 pivotally mounted on the vehicle frame 115. An arm 118 of shaft 117 is connected to valve spool 91 through link 119.

The lost motion link 114 includes a master clutch control valve 121 constituting a part of the transmission clutch control linkage. As shown in FIG. 8, the master clutch control valve 121 has a pair of relatively shiftable members in the form of a valve housing 122 and a valve spool 123 which are resiliently biased to a neutral position, in which illustrated, by centering springs 124, 125. The housing has a pair of aligned pivot trunnions 126, 127 which are pivotally connected to the ends of arms 116, as shown in FIGS. 1 and 4.

As illustrated in FIGS. 7 and 8, fluid pressure is supplied from engine driven pump, not shown, to the master clutch valve 121 through conduit 131, which is connected by an L-shaped internal passage 132 to the central bore 134 of housing 122. In the neutral position of the control members 122, 123 the fluid in input conduit 131 is blocked at the bore. However, when the operator manually moves the control lever 33 to one of the clutch operating positions designated R1, R2, 1 through 6 on the shift plate 102, as viewed in FIG. 3, the spool 123 will be moved against the biasing influence of the centering springs 124, 125 to a position wherein recess 136 will establish communication between conduit 131 and conduit 137 which is connected to power means 32. Thus initial transverse movement from its neutral position disengages the master clutch 11. A resilient detent means in the form of a ball 141 and spring 142, illustrated in FIG. 6, resiliently resists movement of valve spool 91 from any neutral position. The ball 141 cooperates with annular recess 144 in the neutral position of valve spool 91 and engages recesses 143 and 146 in the low and high range positions, respectively, of spool 91. The resilient detent means 141, 142 resists movement of the linkage controlling valve 91 to a greater extent than the centering springs 124, 125 resist movement of valve spool 123 relative to the housing 122. Thus upon the operator moving control lever 33 transversely to operate link 114, the spool 123 will be moved relative to the housing 122 to a position wherein either branch passage 151 or 152 will be connected to conduit 131 through recess 136.

Fluid supplied through conduit 137 to the actuating chamber 153 of power means 32 will be of sufficient volume to create sufficient pressure to move the piston 43 to the left as viewed in FIG. 2. The small open return passage 154 connecting the chamber 153 to a reservoir, not shown, serves as orificing means to provide a pressure build up in chamber 153. A suitable vent to reservoir passage 156 is provided for master clutch valve 121 and an air vent 157 is provided in the housing 41 of power means 32. When the piston 43 is actuated it moves to the left thereby moving its small cylindrical portion 46 out of its abutting contact with the end of piston 51 of power means 34. Thus the master clutch may be operated by power means 32 independently of piston 51 of power means 34.

As shown in FIGS. 1 and 3 control lever 33 has been moved from its start position to a position wherein valve spool 92 has been shifted from its start position illustrated in FIG. 5 to the 1 and 2 position. In this position clutch 85 will be engaged upon the lever being moved in either transverse direction. Initial movement of lever 33 to position 161 as shown in FIG. 3, for instance, will move the valve spool 123 of the master clutch control valve 121 upwardly relative to the housing 122, thereby causing pressure fluid to be directed to the power means 32, thus disengaging the master clutch. Further movement of lever 33 to position 162 will cause the valve spool 91 to be moved out of its detented neutral position to the right, as shown in FIG. 5, to its low speed position and when this is accomplished the low range clutch 83 and the first speed clutch 85 will be engaged, thus establishing drive through the transmission 81. The master clutch will remain disengaged until the operator allows the lever 33 to return from position 162 to an intermediate position 163 under the influence of centering spring 125. The range control valve 91 remains in its low range position by virtue of the detent means 141, 142 now engaging annular groove 143. Thus, it is seen that the power from the engine is completely disconnected from the transmission during the time the transmission clutches are being engaged.

When the operator wishes to change speed, for instance from first speed, his initial movement of the control lever from position 163 to approximately the position 161, will effect disengagement of the master clutch 11 and then further movement of the control lever 33 in the same direction to position 164 will cause disengagement of the clutches 83 and 85 by shifting the valve spool 91 to its neutral position. Upon release of the control lever 33 it will return to its neutral position designated by the number 33 in FIG. 3. Thus it is seen that the load is removed from the transmission clutches during both engagement and disengagement thereof. This extends the life of the transmission clutches considerably. The master clutch 11 is designed for heavy duty use and if it requires servicing it is much more economical to service than the transmission clutches. Further, use of a master clutch which is disengaged during engagement and disengagement of the transmission clutches also permits a lighter duty transmission clutch to be employed in the change speed transmission 81.

The valve spool 92 is provided with a suitable detent means 150 which acts in annular recesses in the control valve 90 corresponding to the start R1, R2, 1 and 2, 3 and 4 and 5 and 6 positions indicated in FIG. 5. Thus, the detents associated with the control valves are operative to maintain the control lever 33 in the position to which shifted. It is, of course, necessary to provide the detent means for the linkage to control valve 91 on the side of master clutch control valve 121 which is remote from manual control lever 33 in order to effect the desired sequence of operation of the master clutch valve 121 and the transmission valve 89.

The embodiments of the invention for which an exclusive property or privilege is claimed are defined as follows:

1. A control for a vehicle power train of the type including a master clutch and a change speed transmission having fluid actuated clutches, said control comprising:
    means for selectively actuating said fluid actuated clutches including
        a control valve having a flow control component shiftable between clutch actuating positions, and
        a manually operated control linkage mechanically connected to said component for shifting the latter, fluid power means for operating said master clutch, and means automatically disengaging said master clutch during engagement and disengagement of said fluid actuated clutches including
    a master clutch valve for controlling said fluid power means having relatively shiftable members and
    means connecting one of said shiftable members to an intermediate portion of said linkage.

2. The structure set forth in claim 1 wherein said relatively shiftable members constitute interconnecting parts of said linkage.

3. The structure set forth in claim 2 wherein said members are relatively shiftable in opposite directions from a neutral position, in which said master clutch is engaged, to operating positions in which said msater clutch is disengaged.

4. The structure set forth in claim 3 wherein said master clutch valve includes resilient centering means biasing said members to said neutral position.

5. The structure set forth in claim 4 including resilient detent means operatively associated with said flow control component resiliently resisting movement of said component from its clutch actuating positions, the resistance afforded by said detent means to manual movement of said control linkage being greater than the resistance afforded by said resilient centering means to such manual movement.

6. The structure set forth in claim 5 wherein said detent means act directly on said component.

7. The structure set forth in claim 5 and further comprising means for operating said master clutch independently of said means for selectively actuating said fluid actuated clutches.

8. The structure set forth in claim 5 wherein said flow control component has a neutral position intermediate said clutch actuating positions and wherein said resilient detent means also resiliently resists movement of said component from its neutral position.

9. The structure set forth in claim 8 wherein said control linkage includes a manual control lever movable between neutral and clutch actuating positions corresponding to the neutral and clutch actuating positions of said flow control component and wherein initial movement of said lever in a direction from one toward another of said positions effects movement of said master clutch valve members from their neutral position to one of their operating positions, wherein further movement of said lever in said direction causes said flow control component to be shifted from one to another of its detented positions and wherein subsequent release of said lever permits it to be moved in the opposite direction by said centering means whereby said master clutch valve members return to their neutral position.

References Cited by the Examiner
UNITED STATES PATENTS

| | | | |
|---|---|---|---|
| 2,318,258 | 5/1943 | Porter | 192—3.5 |
| 2,916,118 | 12/1959 | Bakus et al. | 192—3.5 |
| 2,934,185 | 4/1960 | Backus et al. | 192—3.5 |
| 3,104,742 | 9/1963 | Alferi et al. | 192—3.5 |

DAVID J. WILLIAMOWSKY, *Primary Examiner.*

BENJAMIN W. WYCHE III, *Examiner.*